Dec. 15, 1931.  A. LENNING  1,836,719
AIR COOLED REFRIGERATOR
Filed Nov. 15, 1927    4 Sheets-Sheet 3

INVENTOR
Alvar Lenning
BY
Wm. J. Hedlund
his ATTORNEY

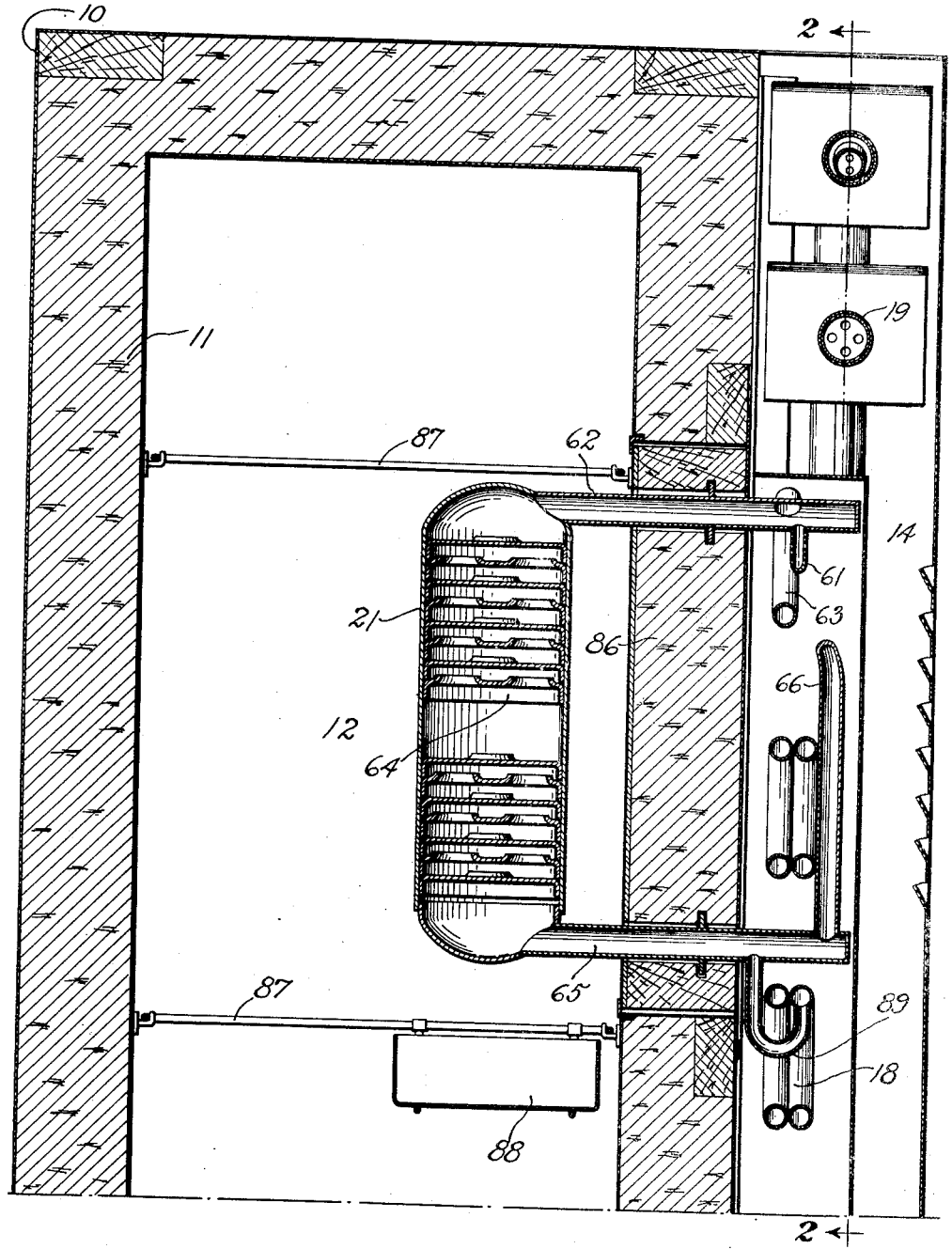

Patented Dec. 15, 1931

1,836,719

UNITED STATES PATENT OFFICE

ALVAR LENNING, OF NEW YORK, N. Y., ASSIGNOR TO ELECTROLUX SERVEL CORPORATION, OF NEW YORK, N. Y., A CORPORATION OF DELAWARE

AIR COOLED REFRIGERATOR

Application filed November 15, 1927. Serial No. 233,366.

The object of my invention is to provide a refrigerating apparatus of the absorption type which will operate efficiently while cooled by air. More particularly I aim to provide an air cooled absorption refrigerating apparatus of the continuous type. As a still further object of the invention I aim to provide a novel, neat and efficient combination of refrigerating apparatus with a refrigerator cabinet.

Amongst the features of my invention are: a flue for cooling the absorber and condenser of an absorption machine arranged alongside the food space of a cabinet, the absorber being placed in a relatively low position and the condenser near the top of the flue; a grid surrounding the absorber for adequately cooling the absorber by air, which grid in effect is a part of the flue for causing air circulation; a condenser for an air cooled apparatus which is capable of offering different amounts of cooling surfaces for the refrigerant for different loads; a novel arrangement for and method of precooling refrigerant before entering the evaporator; and a combined unit of high operating efficiency while eliminating cooling by liquid such as water; which features will hereinafter be more fully described.

Preferably my novel refrigerating apparatus is of the constant pressure continuous type wherein an auxiliary agent, in the presence of which the cooling agent (refrigerant) evaporates, circulates in a continuous cycle through the absorber and evaporator. In such cycle I provide further novel features as will be presently described. My invention is illustrated by means of the accompanying drawings of which:

Fig. 1 and Fig. 2 make up a complete side view partly in cross-section by joining the figures on the dash-and-dot lines;

Fig. 4 is a cross-section taken on the line 4—4 of Fig. 2; Figs. 3 and 4 when joined on the dash-and-dot lines make up a cross-sectional view of the combined refrigerator cabinet and refrigerating apparatus.

Figure 1:
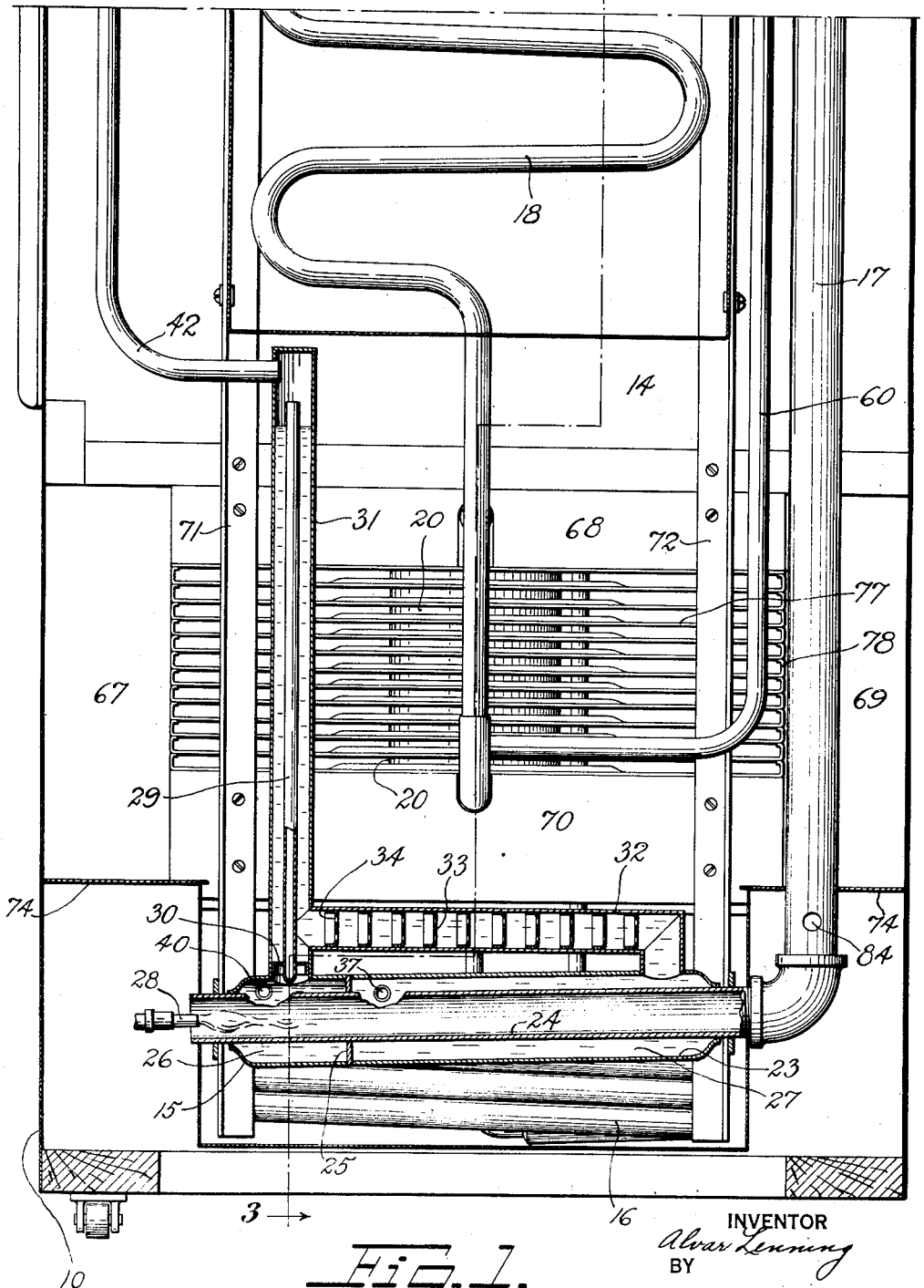
Fig. 1 is the lower half of a side view of the refrigerator built in accordance with my present invention, a portion of the casing being in cross-section to show parts of the refrigerating apparatus and parts of the refrigerating apparatus being shown in cross-section.
Figure 2:
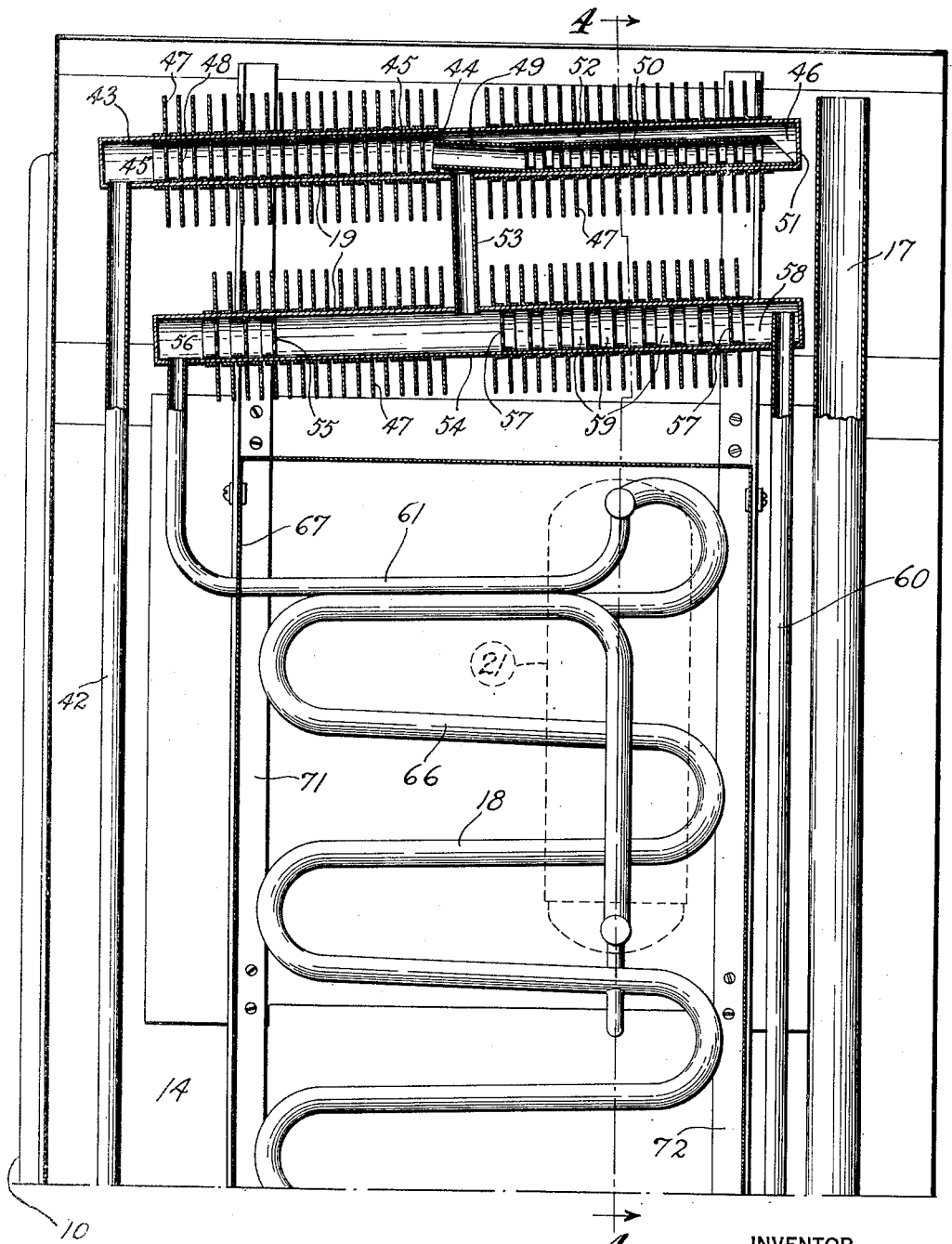
Fig. 2 is a top view of the nature of Fig. 1.

On the drawings, reference character 10 designates generally the refrigerator cabinet as a whole. A section of the cabinet is insulated by insulating material 11 to form food space 12. Below the food space is a compartment 13. To one side of the food space is a flue 14. Flue 14 extends from the bottom of the cabinet to the top and is open at the top.

The refrigerating apparatus comprises a generator 15, a liquid heat exchanger 16, an off-take duct for products of combustion 17, a gas heat exchanger 18, a condenser 19, an absorber 20, and an evaporator 21, these parts being suitably interconnected by conduits to form various cycles for flow of fluid.

The generator 15 is contained within a housing 22 which is filled with insulating material. It comprises a main shell 23 through which extends the heating tube 24. A partition 25 divides the generator proper into a strong liquid chamber 26 and a weak liquid chamber 27. A gas burner 28 projects into conduit 24 for heating the generator. The generator contains the cooling agent or refrigerant in solution. I prefer ammonia as the cooling agent dissolved in water as the absorption liquid. A riser pipe 29 is connected to strong liquid chamber 26, passes through a partition 30 and discharges into a stand pipe 31. The partition 30 separates stand pipe 31 from strong liquid chamber 26. Stand pipe 31 is connected at the bottom with weak liquid chamber 27 by means of conduit 32 containing discs 33 with apertures 34 in the same.

Liquid heat exchanger 16 includes an outer conduit 35 and an inner conduit 36. The outer conduit is connected at one end to weak liquid chamber 27 and at the other end to the upper part of the absorber by means of conduits 37 and 38 respectively. The inner conduit 36 is connected to the lower part of the absorber by means of conduit 39 and to the strong liquid chamber 26 by means of conduit 40.

Circulation of absorption liquid takes place between the generator and absorber as follows: Strong absorption liquid enriched in cooling agent passes out of the absorber through conduit 39, passes through conduit 36 and enters the strong liquid chamber 26 through conduit 40. From chamber 26 the liquid is lifted due to thermo-siphon action through riser pipe 29. The liquid in riser pipe 29 is partially vaporized by the heat supplied by the gas burner or other source of heat used and vapor and liquid passes through the riser pipe into stand pipe 31. I provide a thermo-siphon hole 41 in order to aid the percolating action. Liquid in stand pipe 31 passes downwardly therein and through conduit 32 into weak liquid chamber 27 where it is still further deprived of gaseous cooling agent which passes in counter-current to the liquid back through conduit 32 and through the liquid in the stand pipe and out at the top of the stand pipe through conduit 42. Discs 34 produce an analyzing action. Weak liquid leaves chamber 27 through conduit 37, passes through conduit 35, the outer conduit of heat exchanger 16, and through conduit 38 to discharge into upper part of the absorber.

Vapor passes through conduit 42 which is connected to the top of stand pipe 31 and upwardly to a hollow member 43 which, in the embodiment shown, consists of a cylindrical tube arranged near the top of flue 14 and inclined slightly from the horizontal so that liquid in the same may flow downwardly back toward conduit 42. Hollow member 43 constitutes a part of the condenser. Within hollow member 43 a partition 44 divides the same into a primary chamber 45 (so called because it is the first chamber of a series of condenser chambers) and rectifier chamber 46. The hollow member 43 is surrounded by a series of fins 47 which give a large surface for the cooling of the hollow member by surrounding air passing upwardly through flue 14. The fins are arranged substantially vertically. Within chamber 45 is a series of baffling members 48 which have holes in the same for passage of gas and which may be cut away at the bottom to form a channel for flow of liquid along the bottom of hollow member 43 toward conduit 42. Holes may be used in baffles 48 without cuts in the edges to form a channel, in which case liquid will accumulate to the heights of the lowermost holes. This will not vary the function. Primary chamber 45 is a rectifying chamber. Here absorption liquid entrained with the vapor of the cooling agent is condensed due to the cooling action of the surrounding air and flows backwardly toward the generator. Vapor of the cooling agent passes through an opening in aperture 44 in which is fitted one end of a conduit 49 which passes within chamber 46 and in contact with the bottom thereof. Conduit 49 contains discs 50 which also have apertures in them. Conduit 50 is smaller than hollow member 43 and leaves a vapor space surrounding the same within chamber 46. The higher end is open at 51 and vapor of the cooling agent passes into chamber 46 around the conduit 49. The space or chamber around conduit 49 is indicated by reference character 52. Vapor condenses in chamber 52 due to the cooling action of the surrounding air and heat transmission by means of fins 47 and the condensed cooling agent flows along the bottom of chamber 52 in contact with the outside of conduit 49. This liquid cools the gaseous fluid within conduit 49 and precipitates out further absorption liquid which flows backwardly toward the generator. Some of the cooling agent is evaporated due to the heating effect of conduit 49 but it again condenses in the space 52. Liquid after rectification leaves chamber 52 through duct 53 and enters an intermediate space in a second hollow member 54 which also is surrounded by fins 47 and which also is, in the embodiment shown, formed as a hollow cylinder and inclined slightly from the horizontal. There are two sets of discs in hollow member 54: one, at the left as shown, lettered 55, which forms a pre-cooling chamber 56 at the left hand end, as shown, of the hollow member 54; and, a second set of discs 57 which form an extension chamber between the remote discs 57 and at the right hand end of which, as shown, is a vent chamber 58. Discs 55 and 57 are similar to discs 48 and have apertures in the same. The inclination of member 54 is downwardly from the vent chamber to the precooling chamber.

Liquid cooling agent passes downwardly through duct 53 and some vapor passes with it. There is further condensation in hollow member 54. If the load is great or the temperature of the air is above normal, a portion of the refrigerant is not condensed in chamber 52 and the left hand portion of chamber 54, which causes a slight increase in pressure enabling the uncondensed refrigerant to displace an inert gas from extension chamber 59 through conduit 60, whereupon condensation takes place within the extension chamber between discs 57. The extension chamber is indicated by reference character 59. The greater the amount of vapor passing through duct 53, the greater is the portion of chamber 59 which is used for condensation. Upon a decrease in load or reduction in air temperature, there occurs a slight reduction of pressure in the condenser, due to the excess cooling thereof, which results in inert gas being drawn into chamber 59, thus reducing, more or less, the surface available for condensing refrigerant. It is thus seen that there is provided a condenser of variable capacity for different loads and different air temperatures. The particular condenser shown is intended for operation with a system having inert gas in the presence of which the cooling agent evaporates. Some of this inert gas is entrained with absorption liquid, is driven out in the generator and passes to the condenser. This inert gas passes downwardly through duct 53 and some of it passes into chamber 56, the remainder passing into chamber 59 from which it normally passes through conduit 60 and from which it may be displaced as above described. Assuming that this inert gas is hydrogen and that the cooling agent is ammonia, hydrogen being in the presence of ammonia in chamber 56 reduces the partial pressure of the ammonia. There is thus an atmosphere, the temperature of which may be reduced still further without condensation of ammonia taking place. If the temperature is reduced sufficiently to cause condensation under these conditions, the partial pressure of the ammonia will be further reduced and, consequently, that of the hydrogen increased until an equilibrium is established and further condensation will not occur. This atmosphere acts as a sort of cushion through which the liquid cooling agent must flow. Since there is a cooling of this chamber, the liquid cooling agent is cooled to a temperature which, at the total pressure obtaining in chamber 46, is in the liquid region of the Mollier diagram. Thus there is precooling of the cooling agent before it enters the evaporator. Hydrogen gas works past discs 57 and into vent chamber 58 and thence passes through vent pipe 60 to be conveyed into evaporator-absorber cycle. It will be seen that the hollow members 43 and 54 are superposed one above the other in the flue 14, the arrangement being such that the draft passes first past the colder member 54 and then the hotter member 43.

Liquid leaving the precooling chamber 56 passes through conduit 61 and into conduit 62, whence it flows into the evaporator shell 21.

In the apparatus as built for use, a casting of aluminum or other heat transmitting material with large surface would be placed around evaporator 21, such casting containing suitable pockets for ice trays.

The auxiliary agent, preferably hydrogen, is introduced into conduit 62 from conduit 63. In the evaporator the ammonia diffused into the hydrogen passes from liquid to gaseous form as a result of which heat is taken up from the surrounding objective of refrigeration which, in the instant case, is the food space of the cabinet. The evaporator contains a series of discs 64 for distributing liquid and for obtaining a large surface of gas and liquid contact. The gas mixture formed in the evaporator passes out through conduit 65 at the bottom of the evaporator and then passes through conduit 66. Conduit 63 forms one space and conduit 66 a co-operating space of heat exchanger 18. These two conduits are arranged in solder contact one alongside the other and are arranged in zig-zag formation within a casing or compartment 67 which is filled with insulating material. It will be noted that a high, long heat exchanger is produced by this arrangement which contains only single passages for each fluid, which is simple in manufacture and which has excellent heat transfer. Conduit 66 is carried in an upwardly extended loop from conduit 65 in order to obtain an extended heat exchange surface. Conduit 66 is connected to the bottom part of the absorber and conduit 63 is connected to the upper part of the absorber. Conduit 38 is connected to conduit 63 and vent pipe 60 is connected to the lower part of conduit 66.

Figure 3:
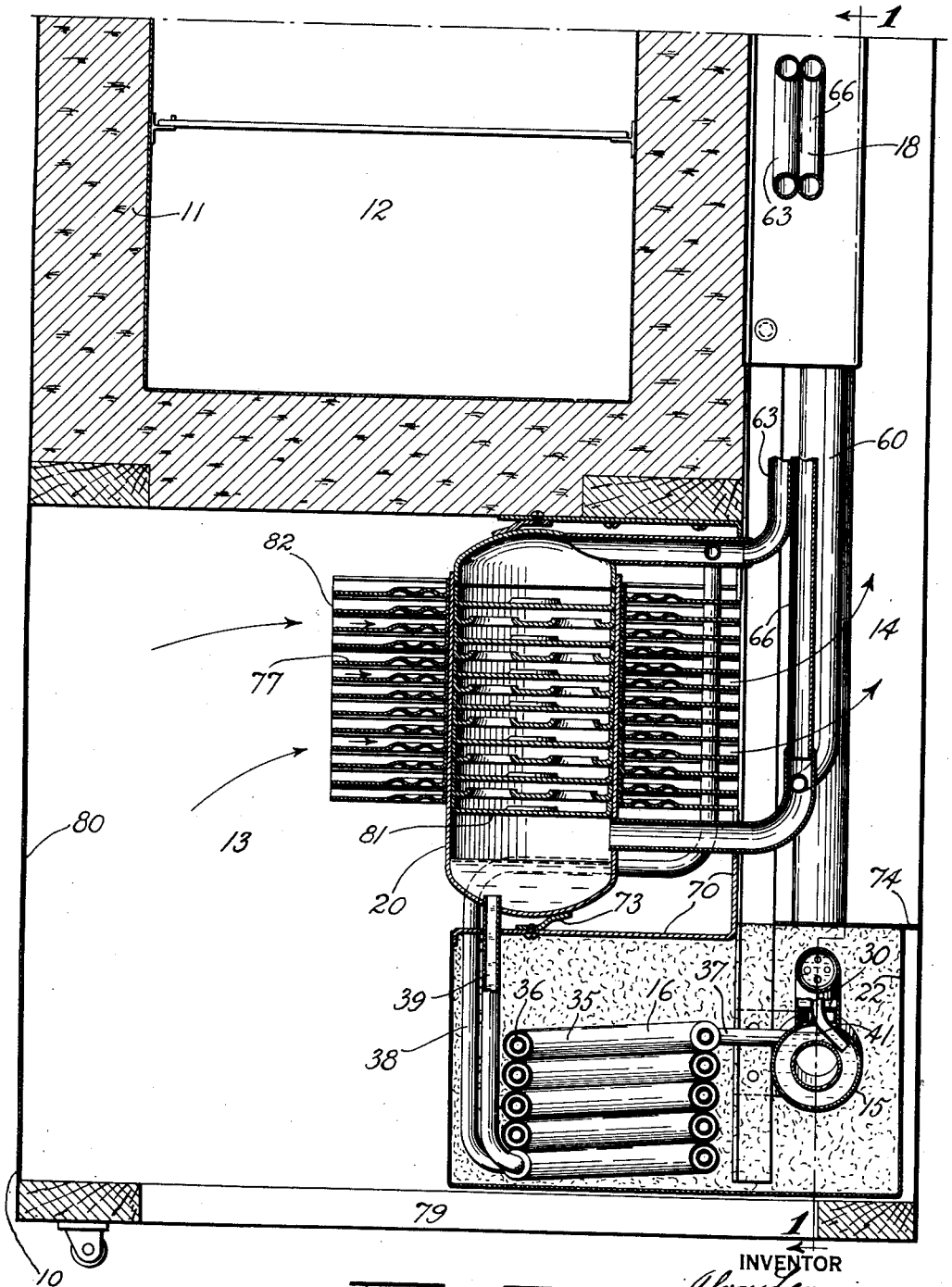
Fig. 3 is a cross-section taken on the line 3—3 of Fig. 1.

By placing absorber 20 within chamber 13 below the food space the greatest portion of the upper part of the cabinet is used for food space which is a convenience to the user. Furthermore, this arrangement gives an improved cooling effect with air. Referring to Figure 3, the right hand wall of the outside of the insulation extends vertically. The flue 14 is to the right of this. A series of plates 67, 68, 69 and 70 (Fig. 1) are in line with this right hand wall. Of these plates, those lettered 68 and 70 are fastened to angle-irons 71 and 72 which extend upwardly along the wall referred to and to which the casing 67 is secured. A plate 74 extends horizontally at the top of casing 22. A plate may be placed on the top of casing 22 or the insulating material within the same may give a surface at the top of this casing. This provides a horizontal floor for flue 14. Plate 70 is bent horizontally as shown in Fig. 3 to form the top of a compartment containing the heat exchanger 16 which is also filled with heat insulating material. The absorber is in part supported on this plate by means of the member 73. A similar member at the top of the absorber serves as a second support.

Between plates 68 and 70 and between plates 67 and 69 (these plates are in the same plane or substantially the same plane as above described) there is a rectangular opening. Through this opening as viewed in Fig. 1 can be seen a grid arrangement of parallel plates 77. These plates are placed horizontally and surround absorber 20. They may be shrunk onto the absorber or otherwise firmly contacted with the absorber to give good heat transfer. This grid surrounding the absorber may be said to be set into or against the lower opening of flue 14. All the air entering flue 14 must pass between the plate members 77 of the grid. The plates 77 are bent at each side as indicated at 78 to form walls extending vertically along each side of the grid. The grid in effect makes up a box extension to the flue 14 divided into a series of parallel passages into which the absorber is set. The air may enter chamber 13 either through the bottom opening 79 or through louvers arranged in plate 80. The absorber 20 contains a series of discs 81 which distribute liquid within the absorber and act to transmit heat. These discs are tightly arranged against the inner surface of the absorber shell opposite the grid plates 77.

The air enters the open end of the boxlike grid indicated by reference character 82 in Fig. 3, flows through the parallel passages between the grid plates and into flue 14 and upwardly through flue 14. The circulation of the air through the flue is caused by the heat supplied by the absorber and by the condenser. The air in flue 14 will become very much hotter than air outside the refrigerator and there will be set up a continuous flow of air past the absorber upwardly through flue 14 and past the condenser. The conduit 17 for products of combustion also passes upwardly through flue 14. In this conduit at the bottom is a draft hole 84.

The arrangement is such that the refrigerating apparatus may be made as a unit independently of the cabinet and may be inserted into the cabinet from the side. For assembly, section 86 of the side wall is made separately, built onto the apparatus and set into an opening in the side wall made for the same when the apparatus unit is fitted to the cabinet. The cabinet is provided with suitable shelves 87 and defrosting pan 88.

A conduit 89 conducts any unevaporated liquid which passes to the lower part of the evaporator into heat exchanger conduit 66 which is the heavy gas line. The circulation of hydrogen between evaporator and absorber is effected continuously due to the difference in specific weight of the mixture of gases in the evaporator and in conduit 66 against the lighter gas in the absorber and in conduit 63.

The whole apparatus is made of metal.

It will be evident that the flue can be on the back of the cabinet instead of the side and the apparatus built to be fitted in from the back without altering the structural make-up.

While I have described one form of my invention, it will be understood that I am not limited to the form shown but that many variations may be made within the spirit and scope of the invention.

Having thus described my invention, what I claim is:

1. An air cooled refrigerator comprising a cabinet having an insulated food space, a flue adapted for flow of air extending vertically alongside said food space, said flue having a lower inlet below the food space and an upper outlet, a grid arranged at the inlet to the flue comprising a series of parallel members forming a plurality of parallel passages and an absorber set into said grid.

2. An air cooled refrigerator comprising a cabinet having an insulated food space, a flue adapted for flow of air extending vertically alongside said food space, said flue having a lower inlet below the food space and an upper outlet, a grid arranged at the inlet to the flue comprising a series of parallel members forming a plurality of parallel passages, an absorber set into said grid and a condenser in the upper part of said flue.

3. An air cooled refrigerator comprising a cabinet having an insulated food space, a flue extending vertically alongside said food space, said flue having a lower inlet below the food space and an upper outlet, a grid arranged at the inlet to the flue comprising a series of parallel members forming a plurality of parallel passages, an absorber set into said grid, a condenser in the upper part of the flue, a generator and an off-take duct for said generator, said off-take duct passing within said flue.

4. An air cooled refrigerator comprising a cabinet having an insulated food space, a flue adapted for flow of air extending vertically alongside said food space, a cylindrical absorber arranged vertically on its axis below said food space, a series of horizontal plates surrounding said absorber, and means for preventing access of air to said flue except past said horizontal plates.

5. An air cooled refrigerator comprising a cabinet having an insulated food space, an evaporator in said food space, a condenser outside said food space above said evaporator, an absorber below said food space and a flue for conducting air past said absorber and upwardly past said condenser.

6. An air cooled refrigerator comprising a cabinet having an insulated food space, an evaporator in said food space, a condenser outside said food space above said evaporator, an absorber below said food space and a flue for conducting air horizontally past said absorber and upwardly past said condenser.

7. A condenser, an evaporator, said condenser having a direct path toward said evaporator, a channel projecting from said path and inclined downwardly toward the path, a series of apertured baffling members in said channel and means to cool said channel.

8. Refrigerating apparatus comprising a generator, a condenser, an evaporator, an absorber, the aforesaid parts being interconnected to form a system for circulation of a cooling agent, an absorption liquid and an auxiliary agent in the presence of which the cooling agent evaporates, said condenser comprising a hollow member slightly inclined from the horizontal, a partition dividing said hollow member into a primary chamber and a rectifier chamber, a series of baffles in said primary chamber, a conduit connecting said primary chamber with said rectifier chamber passing within the rectifier chamber, a series of baffles in said conduit, said conduit being arranged to drain into said primary chamber, a second hollow member slightly inclined from the horizontal, a duct connecting a low point of said rectifier chamber with an intermediate point of the second hollow member, baffles in said second hollow member forming a condenser extension chamber, a vent chamber and a precooling chamber, a conduit adapted to conduct liquid from the precooling chamber and a vent pipe connected to said vent chamber.

9. Refrigerating apparatus comprising a generator, a condenser, an evaporator, an absorber, the aforesaid parts being interconnected to form a system for circulation of a cooling agent, an absorption liquid and an auxiliary agent in the presence of which the cooling agent evaporates, said condenser comprising a hollow member, a partition dividing said hollow member into a primary chamber and a rectifier chamber, a series of baffles in said primary chamber, a conduit connecting said primary chamber with said rectifier chamber passing within the rectifier chamber, a series of baffles in said conduit, said conduit being arranged to drain into said primary chamber, a second hollow member, a duct connecting a low point of said rectifier chamber with an intermediate point of the second hollow member, baffles in said second hollow member forming a condenser extension chamber, a vent chamber and a precooling chamber, a conduit adapted to conduct liquid from the precooling chamber and a vent pipe connected to said vent chamber.

10. Refrigerating apparatus as claimed in claim 9 with fins projecting outwardly from the hollow members.

11. That improvement in the art of refrigerating which consists in precooling the liquid to be evaporated by passing it through a confined atmosphere of an inert gas mixed with vapor of the said liquid in heat exchange relation with a cooling substance before introducing the said liquid into heat exchange relation with the objective of refrigeration.

12. Refrigerating apparatus comprising a generator, an evaporator, a condenser, said condenser comprising a hollow member, a series of baffling members in said hollow member, a vent pipe connected to said hollow member to one side of said baffling members, means to supply liquid to said hollow member to the other side of said baffling members and means to cool the hollow member.

13. Refrigerating apparatus comprising a generator, an evaporator, a condenser interposed between the evaporator and generator, said condenser comprising a substantially horizontal, slightly inclined hollow member, a series of baffling members in said hollow member, a pipe connected to said hollow member to one side of said baffling members at a relatively high point thereof, means to supply condensed refrigerant derived from said generator to said hollow member to the other side of said baffling members, a series of fins surrounding said hollow member and in contact with the atmosphere to cool the same and means to withdraw liquid from a lower portion of said hollow member.

14. A refrigerating system including a generator, an absorber, an evaporator and a cooling and liquefying element comprising a plurality of superposed air-cooled hollow members, the lower hollow member having a plurality of groups of baffling members within the same forming a space between the groups, a duct connecting a higher hollow member with said space, means to withdraw liquid from one end of said lower hollow member and means to withdraw gas from the other end.

15. Refrigerating apparatus comprising a generator, an evaporator, an air-cooled condenser interposed between said generator and evaporator and comprising a series of chambers, the chambers being combined to form two groups, the group nearest the generator in matter of connection being located above the group connected nearest the evaporator in matter of connection, and means to pass a current of air upwardly past the two groups.

16. Refrigerating apparatus comprising an evaporator, an absorber, and means for circulating fluid between and through the evaporator and absorber comprising two extended conduits arranged in zig-zag formation and soldered together substantially throughout their lengths, said conduits forming a heat exchanger having a single path of flow for each of oppositely flowing fluids.

17. An air-cooled refrigerator comprising a cabinet having an insulated food space, an evaporator in said food space, a condenser outside said food space above said evaporator, an absorber, a flue for conducting air past said absorber and past said condenser, a generator containing a cooling agent in solution in absorption liquid and conduits connecting the generator, condenser, evaporator and absorber to form a system, said system comprising means for circulating an auxiliary agent between the evaporator and absorber in the presence of which the cooling agent evaporates.

18. An air-cooled refrigerator comprising a cabinet having an insulated food space, an evaporator in said food space, a condenser outside said food space above said evaporator, an absorber below said food space, a flue for conducting air horizontally past said absorber and upwardly past said condenser, a generator below said food space containing a cooling agent in solution in absorption liquid and conduits connecting the generator, condenser, evaporator and absorber to form a system, said system comprising means for circulating an auxiliary agent between the evaporator and absorber in the presence of which the cooling agent evaporates.

19. An air-cooled refrigerator comprising a cabinet having an insulated food space, a flue adapted for flow of air extending vertically alongside said food space, said flue having a lower inlet below the food space and an upper outlet, a grid arranged at the inlet to the flue comprising a series of parallel members forming a plurality of parallel passages, an absorber set into said grid, a generator outside said food space containing a cooling agent in solution in absorption liquid, an evaporator inside said food space, a condenser in said flue and conduits connecting the generator, condenser, evaporator and absorber to form a system, said system comprising means for circulating an auxiliary agent between the evaporator and absorber in the presence of which the cooling agent evaporates.

20. That improvement in the art of refrigeration which consists in introducing vaporous refrigerant into a chamber, cooling the chamber to liquefy the vaporous refrigerant and introducing an inert gas into said chamber to decrease the rate of liquefaction of the vaporous refrigerant.

21. That improvement in the art of refrigeration which consists in introducing vaporous refrigerant into a chamber containing an inert gas, cooling the chamber to liquefy the vaporous refrigerant and varying the amount of inert gas in the chamber to vary the rate of liquefaction of the vaporous refrigerant.

22. That improvement in the art of refrigeration which consists in introducing vaporous refrigerant into a chamber having a given heat-exchange surface, cooling said surface to liquefy vaporous refrigerant in heat-exchange relation therewith and introducing an inert gas into said chamber to displace the vaporous refrigerant from heat-exchange relation with a portion of said surface.

23. That improvement in the art of refrigeration which consists in introducing vaporous refrigerant into a chamber containing an inert gas and having a given heat-exchange surface, cooling said surface to liquefy vaporous refrigerant in heat-exchange relation therewith and varying the quantity of inert gas in said chamber to vary the amount of said surface in heat-exchange relation with the vaporous refrigerant.

24. A refrigerating system comprising a condenser, means for introducing vaporous refrigerant into said condenser, means for cooling said condenser, an evaporator, said condenser having a direct path from the point of introduction of said vaporous refrigerant toward said evaporator, a channel projecting from said path and inclined downwardly toward the path, means for cooling said channel and means for supplying an inert gas to the upper end of said channel.

25. A refrigerating system comprising a condenser, means for introducing vaporous refrigerant into said condenser, means for cooling for said condenser, an evaporator, said condenser having a direct path from the point of introduction of said vaporous refrigerant toward said evaporator, a channel projecting from said path and inclined downwardly toward the path, a series of baffles in said channel, means for cooling said channel and means for supplying an inert gas to the upper end of said channel.

26. A refrigerator comprising a cabinet having walls forming an insulated food compartment, a lower apparatus compartment and a vertically extending air draft compartment, and a refrigerating apparatus having a portion thereof in said lower compartment, a portion thereof in said air draft compartment and a portion thereof in said food compartment, the portion thereof in said lower compartment including a heat rejecting element, a grid on said heat rejecting element forming a plurality of passageways for the flow of air in heat-exchange relation with said element, said air draft compartment being open at the lower part thereof to receive air from said passageways and having an opening in the uper part thereof whereby a natural draft is obtained due to heating of said air by said element, said apparatus being a hermetically sealed structure and being removable as a unit from said cabinet.

27. A refrigerator comprising a cabinet having walls forming an insulated food compartment, a lower apparatus compartment, a vertically extending air draft compartment and an opening between said food compartment and said air draft compartment, and a refrigerating apparatus having a portion thereof in said lower compartment, a portion thereof in said air draft compartment, a portion thereof in said food compartment and a conduit extending through said opening, a closure member for closing said opening secured to said conduit, the portion of said apparatus in said lower compartment including a heat rejecting element, a grid on said heat rejecting element forming a plurality of passageways for the flow of air in heat-exchange relation with said element, said air draft compartment being open at the lower part thereof to receive air from said passageways and having an opening in the upper part thereof whereby a natural draft is obtained due to heating of said air by said element, said apparatus being a hermetically sealed structure and being removable with said closure member as a unit from said cabinet.

28. A refrigerator comprising a cabinet having walls forming an insulated food compartment, a lower apparatus compartment and a vertically extending air draft compartment, and a refrigerating apparatus having an absorber in said lower compartment, a condenser in said air draft compartment and an evaporator in said food compartment, a grid on said absorber forming a plurality of passageways for the flow of air in heat-exchange relation with said absorber, said passageways communicating with the lower part of said air draft compartment, said air draft compartment having an opening near the top thereof whereby a natural draft through said passageways and said air draft compartment is obtained due to heating of said air by said absorber, said apparatus being a hermetically sealed structure and being removable as a unit from said cabinet.

29. A refrigerator comprising a cabinet having walls forming an insulated food compartment, a lower apparatus compartment, a vertically extending air draft compartment and an opening between said food compartment and said air draft compartment, and a refrigerating apparatus having an absorber in said lower compartment, a condenser in said air draft compartment, an evaporator in said food compartment and a conduit connected to said evaporator extending through said opening, a closure member for closing said opening secured to said conduit, a grid on said absorber forming a plurality of passageways for the flow of air in heat-exchange relation with said absorber, said passageways communicating with the lower part of said air draft compartment, said air draft compartment having an opening near the top thereof whereby a natural draft through said passageways and said air draft compartment is obtained due to heating of said air by said absorber, said apparatus being a hermetically sealed structure and being removable with said closure member as a unit from said cabinet.

30. A refrigerator comprising a cabinet formed with an insulated food compartment, a lower apparatus compartment and a vertically extending air draft compartment, a refrigerating apparatus comprising an evaporator located in said food compartment and a heat rejecting member in said lower compartment, and means forming a passageway for the flow of air in heat-exchange relation with said member, said air draft compartment formed with an opening in the lower part thereof for receiving said air and with an opening in the upper part thereof for discharging said air, said refrigerating apparatus and said means forming a passageway being removable from said cabinet as a unit.

31. A refrigerating apparatus comprising a generator, a condenser, an evaporator, an absorber, means to circulate a refrigerant through the aforesaid members, means to circulate an inert gas through said apparatus, means to cool said condenser to liquefy refrigerant therein and a chamber communicating with said condenser and connected to said absorber, said apparatus being so constructed that it will automatically operate to vary the quantity of inert gas in said chamber upon a change of pressure therein and thereby vary the capacity of said condenser.

32. A refrigerating apparatus comprising a generator, a condenser, an evaporator, an absorber, means to circulate a refrigerant through the aforesaid members, means to circulate an inert gas through said apparatus, means to cool said condenser to liquefy refrigerant therein and a chamber communicating with said condenser and connected to said absorber, said apparatus being so constructed that it will automatically operate to vary the quantity of inert gas in said chamber upon a change of temperature therein and thereby vary the capacity of said condenser.

33. A refrigerating apparatus comprising a generator, a condenser, an evaporator, an absorber, means to circulate a refrigerant through the aforesaid members, means to circulate an inert gas through said apparatus, means to cool said condenser to liquefy refrigerant therein and a chamber communicating with said condenser and connected to said absorber, said apparatus being so constructed that it will automatically operate to displace an inert gas from said chamber upon a rise of pressure therein and thereby increase the capacity of said condenser.

34. A refrigerating apparatus comprising a generator, a condenser, an evaporator, an absorber, means to circulate a refrigerant through the aforesaid members, means to circulate an inert gas through said apparatus, means to cool said condenser to liquefy refrigerant therein and a chamber communicating with said condenser and connected to said absorber, said apparatus being so constructed that it will automatically operate to displace an inert gas from said chamber upon a rise of temperature therein and thereby increase the capacity of said condenser.

35. A refrigerating system comprising interconnected parts including a generator, a condenser, an evaporator, and an absorber, and means to circulate refrigerant through said condenser, said condenser being so constructed that it will automatically operate to displace an inert gas therefrom upon a rise of pressure therein and thereby increase the capacity of said condenser.

36. A refrigerating system comprising interconnected parts including a generator, a condenser, an evaporator, and an absorber, and means to circulate refrigerant through said condenser, said condenser being so constructed that it will automatically operate to displace an inert gas therefrom upon a rise of temperature therein and thereby increase the capacity of said condenser.

37. A refrigerating system comprising interconnected parts including a generator, a condenser, an evaporator and an absorber, and means to circulate a refrigerant through said condenser, said condenser being so constructed that it will automatically operate to vary the quantity of an inert gas therein upon a change of pressure therein and thereby vary the capacity of said condenser.

38. A refrigerating system comprising interconnected parts including a generator, a condenser, an evaporator and an absorber, and means to circulate a refrigerant through said condenser, said condenser being so constructed that it will automatically operate to vary the quantity of an inert gas therein upon a change of temperature therein and thereby vary the capacity of said condenser.

39. A refrigerating system comprising interconnected parts including a generator, a condenser, an evaporator and an absorber, and means to circulate refrigerant through said condenser, said condenser being so constructed that it will automatically operate to introduce an inert gas thereinto upon a decrease of pressure therein and thereby decrease the capacity of said condenser.

40. A refrigerating system comprising interconnected parts including a generator, a condenser, an evaporator and an absorber, and means to circulate refrigerant through said condenser, said condenser being so constructed that it will automatically operate to introduce an inert gas thereinto upon a decrease of temperature therein and thereby decrease the capacity of said condenser.

41. A condenser, an evaporator, said condenser having a direct path toward said evaporator, a channel projecting from said path and inclined downwardly toward the path and means to cool said channel, said condenser being so constructed that it will automatically operate to vary the quantity of an inert gas in said channel upon a change of pressure therein and thereby vary the capacity of said condenser.

42. A condenser, an evaporator, said condenser having a direct path toward said evaporator, a channel projecting from said path and inclined downwardly toward the path and means to cool said channel, said condenser being so constructed that it will automatically operate to vary the quantity of an inert gas in said channel upon a change of temperature therein and thereby vary the capacity of said condenser.

43. A condenser, an evaporator, said condenser having a direct path toward said evaporator, a channel projecting from said path and inclined downwardly toward the path and means to cool said channel, said condenser being so constructed that it will automatically operate to displace an inert gas from said channel upon a rise of pressure therein and thereby increase the capacity of said condenser.

44. A condenser, an evaporator, said condenser having a direct path toward said evaporator, a channel projecting from said path and inclined downwardly toward the path and means to cool said channel, said condenser being so constructed that it will automatically operate to displace an inert gas from said channel upon a rise of temperature therein and thereby increase the capacity of said condenser.

45. A condenser, an evaporator, said condenser having a direct path toward said evaporator, a channel projecting from said path and inclined downwardly toward the path and means to cool said channel, said condenser being so constructed that it will automatically operate to vary the quantity of an inert gas in said channel upon a change of pressure therein and thereby vary the effective condensing surface of said channel.

46. A condenser, an evaporator, said condenser having a direct path toward said evaporator, a channel projecting from said path and inclined downwardly toward the path and means to cool said channel, said condenser being so constructed that it will automatically operate to vary the quantity of an inert gas in said channel upon a change of temperature therein and thereby vary the effective condensing surface of said channel.

47. A condenser, an evaporator, said condenser having a direct path toward said evaporator, a channel projecting from said path and inclined downwardly toward the path and means to cool said channel, said condenser being so constructed that it will automatically operate to displace an inert gas from said channel upon a rise of pressure therein and thereby increase the effective condensing surface of said channel.

48. A condenser, an evaporator, said condenser having a direct path toward said evaporator, a channel projecting from said path and inclined downwardly toward the path and means to cool said channel, said condenser being so constructed that it will automatically operate to displace an inert gas from said channel upon a rise of temperature therein and thereby increase the effective condensing surface of said channel.

In testimony whereof I hereunto affix my signature.

ALVAR LENNING.